March 4, 1958 N. D. STEELE 2,825,633
APPARATUS FOR PRODUCING CARBON BLACK
Original Filed April 8, 1952 2 Sheets-Sheet 1

INVENTOR.
N. Dudley Steele
BY
Kenway, Jenney, Witter & Hildreth
Attys.

March 4, 1958 N. D. STEELE 2,825,633
APPARATUS FOR PRODUCING CARBON BLACK
Original Filed April 8, 1952 2 Sheets-Sheet 2
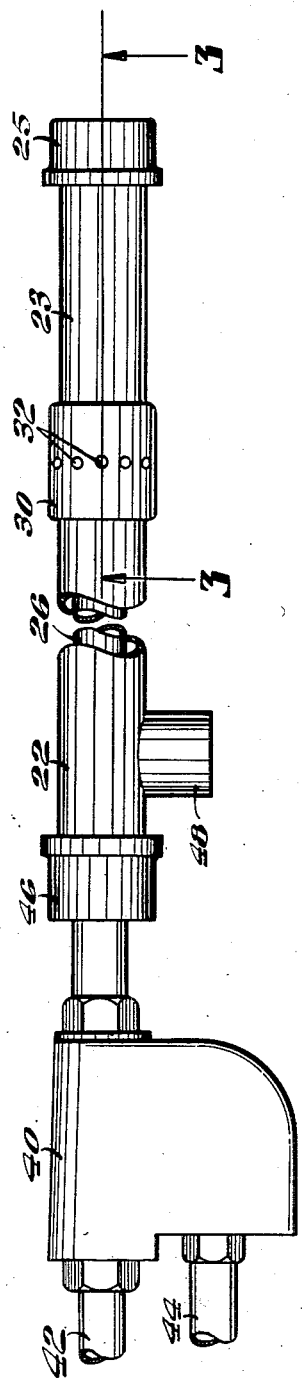
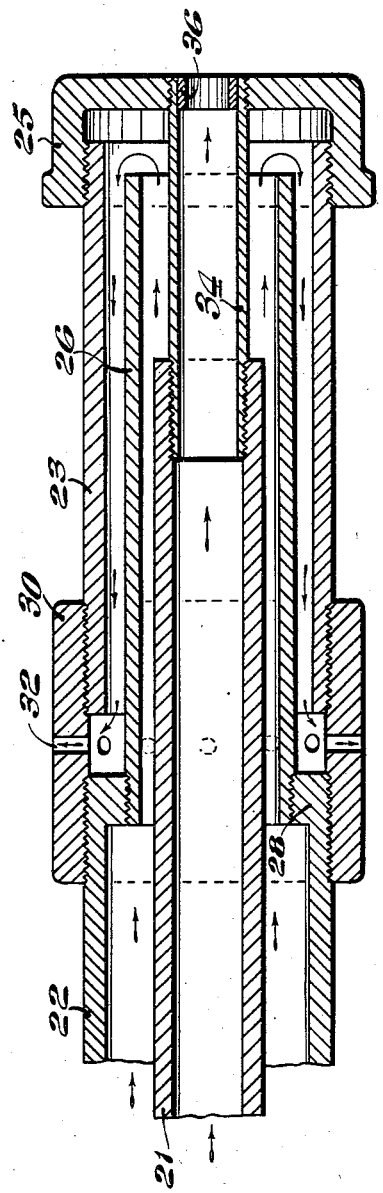
INVENTOR.
N. Dudley Steele
BY
Kenway, Jenney, Witter & Hildreth
attys.

United States Patent Office 2,825,633
Patented Mar. 4, 1958

2,825,633

APPARATUS FOR PRODUCING CARBON BLACK

Newman Dudley Steele, Lafayette, La., assignor to Godfrey L. Cabot, Inc., Boston, Mass., a corporation of Massachusetts Original application April 8, 1952, Serial No. 281,063. Divided and this application August 6, 1954, Serial No. 448,257

5 Claims. (Cl. 23—259.5)

This invention relates to processes and apparatus for producing from liquid hydrocarbons carbon black of novel properties and at improved yields. In certain respects this invention is an improvement over that described in the copending application of Friauf et al., Ser. No. 158,226, filed April 26, 1950.

To obtain carbon black of desired characteristics at high rates of production and high yields it is necessary to apply the necessary heat to dissociate the liquid hydrocarbonaceous raw material in a particular and carefully controlled manner. Numerous processes and varieties of apparatus have been devised for the production of carbon black, all operating according to that basic necessity. Of these, many appear to resemble one another but their differences, though often seemingly slight, are of fundamental importance.

In the carbon black art an improvement over a known process or apparatus which appears as but a modification may in fact lead to an unexpected and important result, whether by way of significant increases in yield of known types of carbon black or by way of producing new types of black not previously known. Such is the case with the process and apparatus of this invention.

The mechanism of carbon black formation is very complicated and is not fully understood. It is, however, well known that a hydrocarbon does not instantaneously divide itself like an amoeba into its components of carbon and hydrogen under the action of heat but in fact travels through a variety of metamorphoses, polymerizing in the process. Consequently, it makes a great difference how and where the heat is applied to the hydrocarbonaceous raw material.

Generally speaking, the particle size, and hence reinforcing effect, of the carbon black depend upon the speed and duration of the dissociation reaction and upon the environment in which the reaction takes place.

Thus to upgrade quality by reducing the particle size of the black or to increase the yield of a known particle size black it is necessary to cause the formation of small particles and to prevent their growth while unreacted hydrocarbon remains in the reaction zone, all without burning any substantial quantity of make raw material. This is accomplished by the novel process and in the novel apparatus of my invention.

Various attempts have been made to supply heat and dilution to the make raw material from a source other than the make material itself. One successful process for doing so is that disclosed in U. S. Letters Patent No. 2,419,565, Krejci, in which the hydrocarbon raw material is in the vapor state when injected into the reactor. The process of the copending Friauf et al. application referred to above has been successful for the purpose when producing carbon black from make material which is liquid when first injected into the furnace. Both processes, however, have their limitations as to quality and yield of carbon black and it is to the production of similar and also different types of black at improved production rates and yields that this invention relates.

A feature of the invention comprises a new, simple and inexpensive unitary burner for fuel and make-hydrocarbon with which to establish unique conditions in a carbon black producing reaction zone.

Broadly, the process of my invention consists in introducing into a suitable carbon black furnace an atomized or vaporized make-hydrocarbon through a single injector pipe centered in the end wall and extending longitudinally of the furnace, simultaneously introducing a combustible fuel gas from a series of points closely surrounding the hydrocarbon injector pipe but at a substantial distance upstream from the point of make-hydrocarbon injection, and flowing an oxygen-containing gas past the fuel gas and make-hydrocarbon in sufficient volume to burn all of the fuel gas and a small proportion of the make-hydrocarbon.

In this connection a novel burner is employed which is characterized by a central oil pipe with a discharge nozzle at its end, in combination with a gas pipe concentrically disposed about the oil pipe in spaced relation thereto, and means within the gas pipe for causing gas to flow longitudinally back and forth within the burner in heat-exchange relation to the reaction space of the furnace and to be directed so as to envelop the oil spray discharged from the nozzle.

It is important that the fuel gas be introduced in a relatively confined combustion space and at sufficient distance upstream of the point of make-hydrocarbon injection in order that the fuel gas may be burned before reaching the hydrocarbon spray. To insure adequate burning of the fuel an excess of air over the theoretical amount required is introduced and hence some small amount of the hydrocarbon will inevitably be burned as well.

In fact, it is one of the advantages of my invention that by reason of the critical relationship between the points of introduction of the make oil, fuel gas and air, a wide variety of operating conditions may be established to produce the many different types of carbon black at a degree of efficiency heretofore not obtained. As the dissociation reaction by which the make-hydrocarbon is converted to carbon black is largely effected by heat transfer from the fuel gas combustion products and since the oxygen containing gas will be air or oxygen diluted with tail gas or other inert gases, there will be a substantial volume of hot diluent gas to mingle with the make-hydrocarbon and this is effective to prevent growth of the carbon particles.

The desired atmosphere is obtained by the steps of mixing fuel gas and air by jetting the gas into the relatively slow moving body of air in a circle immediately around the make-hydrocarbon injector pipe a substantial distance upstream from the point of injection of the make-hydrocarbon. There is thus produced a highly turbulent and very hot mass of combustion products flowing past the spray of raw material with resultant heat transfer to the spray of maximum efficiency and concomitant dilution effect.

The process of my invention is particularly adapted to the use of heavy oils and tars, referred to generally herein as "residual oils," as the source of carbon black. Such residual oils are obtained from a wide variety of hydrocarbon distillation and cracking operations, including the destructive distillation of coal. They are characterized by being not fully vaporizable under atmospheric pressure and some of them will crack to carbon before as little as 50% has gone overhead. Of these I prefer to use the oils having a hydrogen to carbon ratio of from about 0.75 to about 1.25 and a mean molecular weight of from about 225 to about 550. Such oils will also usually have an A. P. I. gravity of not more than 10, a viscosity in excess of 30 SSU (Saybolt seconds Universal) at 210° F. and a Conradson carbon residue in excess of 1.5.

Typical residual oils useful in the practice of this invention are listed in Table I following:

Table I

| Example | Source | H/C Ratio | Average Mol. Wt. | A. P. I. Gravity | Conradson Carbon Residue, percent | Viscosity, SSU—210° F. |
|---|---|---|---|---|---|---|
| I | Petroleum | 1.08 | 391 | 0.5 | 17 | 108 |
| II | do | 1.1 | 310.5 | −0.5 | 17.4 | 135 |
| III | do | 1.16 | 250 | 10.0 | 5 | 35.5 |
| IV | do | 1.05 | 440 | 8.8 | 20 | 337 |
| V | Coal Tar | 1.09 | 277 | 3.7 | 2 | 37 |
| VI | Petroleum | 1.08 | 314 | 1.7 | 15.3 | 84 |
| VII | Coal Tar | 0.79 | 399 | −10.8 | 24 | 112 |
| VIII | Petroleum | 1.15 | 227 | 3 | 4 | 41.5 |

The various features of my invention will best be understood and appreciated from the following description of a typical embodiment of my novel apparatus by the use of which the process of my invention may advantageously be carried out, selected for purposes of illustration and shown in the accompanying drawings in which:

Figure 2 is a view in elevation of the burner; and

Figure 3 is a detail, shown in cross section, of the gas head with peripheral orifices and the atomizing tip.

Figure 1:
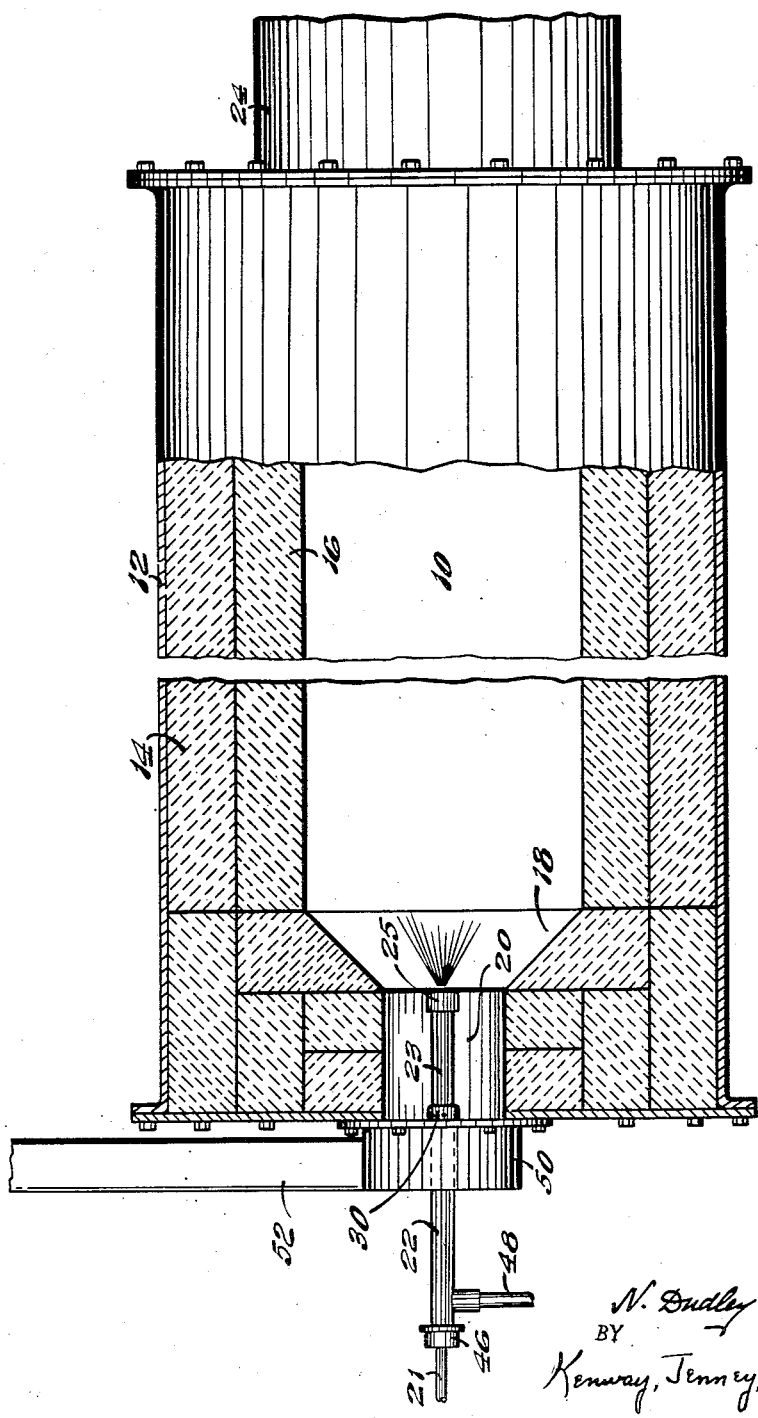
Figure 1 is a diagrammatic view, partly in section and partly in side elevation.

The furnace herein shown includes an elongated reaction chamber 10, which may be of any convenient cross sectional shape, preferably cylindrical, having a steel shell 12, a course of insulating brick 14 and a lining 16 of highly refractory material. At the left or inlet end the reaction chamber 10 tapers rearwardly in a section 18 to an inlet passage or throat 20 of lesser diameter than that of the reaction chamber 10 of the furnace and which provides a confined combustion space and is the only inlet to the furnace. The taper of the section 18 is important in that it approximates the angle of the oil spray cone and thus promotes more efficient radiant heat transfer to the oil spray. A burner pipe 22 is centered in the furnace throat 20 and extends completely through the combustion space of the throat into the furnace and at least to the tapered section 18.

The reaction chamber 10 is open at the end opposite the burner and with this communicates a conventional flue pipe 24 for the passage of the gaseous products of combustion and entrained carbon black to the collectors and exhaust stack in the usual manner.

The multiple burner of my invention through which the make-hydrocarbon oil and fuel gas are introduced into the furnace is shown in Figures 2 and 3. This burner consists of a central oil pipe 21 enclosed concentrically for a portion of its length by a larger gas pipe 22 and an extension 23 having a gas tight cap 25 at its end located within the furnace. A relatively short intermediate pipe 26 is concentrically disposed approximately equidistant between the outer gas pipe extension 23 and oil pipe 21 and is threaded at its upstream end into the shouldered inner wall of pipe 22 by a gas tight seal 28 completely around its circumference. This middle or intermediate pipe 26 is so placed that its downstream end opens in a chamber provided by the cap 25 thus providing for the flow of gas first along the annular passage formed between the oil pipe 21 and the intermediate pipe 26 and then back along the outer annular passage formed between the gas pipe extension 23 and the intermediate pipe 26.

Pipe 22 and its extension 23 are connected by gas head 30 provided with a plurality of orifices 32 disposed equidistant from one another around its periphery. This gas head 30 may be a standard collar, a section of pipe or any other suitable device. The gas pipe 21 is extended at its inner end by a long nipple 34 threaded at one end into the gas pipe and at the other into the cap 25 and having a reducing bushing 36 in its outlet end or discharge nozzle.

It can be seen that the burner assembly illustrated is very simply constructed and can quickly and easily be disassembled for cleaning and for replacement of parts and that parts of different sizes and design can easily be substituted. It will also be readily apparent that the construction of the burner may be modified without departing from the spirit of my invention.

For example, pipe 22 could be of continuous length drilled with gas orifices and making possible the omission of gas head 28. Likewise, instead of extending the oil pipe by the nipple 34 the oil pipe could be continuous. Alternatively, an atomizing nozzle of the flared inlet or orifice type may be provided at the discharge end of the oil pipe 21.

The number and size of orifices 32 are determined largely by the combustion conditions desired. Generally speaking, it is advantageous that as many orifices of as large diameter as possible be provided. However, when extreme turbulence is required fewer orifices of smaller diameter may advantageously be employed. As here shown the orifices are directed radially from the burner pipe but they may be directed downstream at an angle to the radius or helically to impart a spinning motion to the gases.

Oil pipe 21 terminates outside the furnace in a mixing chamber 40 where the liquid hydrocarbon make material, preferably preheated to improve its fluidity, and supplied through inlet pipe 42 is initially aspirated by and mixed with air, steam or other gaseous atomizing fluid, or mixture thereof, introduced through pipe 44. The mixing chamber 40 may be of any conventional design which employs the two-fluid atomization principle. A number of commercial mixers are readily available and satisfactory for the purposes of my invention.

Gas pipe 22 embraces the central oil pipe 21 for a portion only of its total length but terminates outside of the furnace in a gas tight seal 46. Union 48 is provided for the introduction of a combustible gas into the gas stream of the pipe 22.

In operation the make-hydrocarbon atomized with a gas such as air, steam or a combustible or inert gas, in chamber 40 is discharged from pipe 21 into furnace 10 in the form of a conical spray composed of minute droplets of oil. At the same time a combustible fuel gas such as natural gas, coke oven gas, hydrogen or vaporized or atomized liquid hydrocarbon is introduced into the outer end of the confined combustion space of the furnace through gas head 30 in the form of jets that are directed radially and outwardly in respect to the projected axis of the oil supply. Air flows into the furnace under low pressure (about 4–8 inches of water) from header 50 supplied from duct 52 through the combustion space of the furnace throat 20 and thence past gas head 30. The rate of air flow is determined principally by the rate of fuel gas flow and secondarily by the rate of make-hydrocarbon flow, it being the object to supply sufficient air to burn all of the fuel gas and a small portion of the oil. The gas head 30 being sufficiently far upstream from the oil pipe nozzle to insure that substantially all of the gas is burned, principally in the confined combustion space provided by the throat 20, before it can make contact with the oil spray. The hot products of combustion heat the burner in passing through the combustion space and then mingle intimately with the oil spray by virtue of the respective components of flow so that the carbon-black forming reaction occurs almost simultaneously with the introduction of the oil into the reaction zone. Excess air not needed to burn the fuel gas will, of course, burn a small amount of the oil.

The distance between the oil pipe tip and the plane of orifices 32 is subject to considerable variation depending upon the characteristics of the carbon black to be produced. It will not ordinarily be less than about 6 inches and may be as great as about 22 inches. In any event the distance must be sufficient that substantially all of the gas will be burned before reaching the make oil spray but not so far that substantial heat will be lost from the combustion products before mixing with the oil spray.

An important feature of the burner of my invention is that of circulating the fuel gas to the discharge tip and back in reversing flow along the outer conduit in an annular countercurrent stream in contact with the wall of pipe 26 before injection into the furnace through gas head 30. Being exposed to the intense heat generated by the burning fuel the extension pipe 23 would soon fail were it not for the cooling obtained from the circulating fuel gas. At the same time the fuel gas being exposed to the heat transmitted through the walls of pipe 23 is preheated for higher thermal efficiency.

Results obtained by the practice of my invention are set forth in the following examples of runs illustrative of many made in furnaces 5.65 ft. and 10.65 ft. in length. It will be noted that significant increases in yield were obtained by the novel process and in the new apparatus of my invention and that such increased yields were consistently obtained while maintaining and even improving the quality of the product. In those cases where yield was not increased a very great increase in product quality, notably in abrasion resistance in rubber, was the usual result.

charge nozzle of the burner, and a cap at said discharge nozzle providing an opening connecting the annular fuel gas passages for reversing flow of gas in the burner.

2. In a carbon black producing furnace, a burner having a central oil pipe with a discharge nozzle at its end for delivering gas-borne oil to the furnace, an intermediate pipe spaced from the oil pipe and forming an inner annular passage therewith and having an inlet for fuel gas located at its outer end, an outer pipe spaced from the intermediate pipe and forming an outer annular passage therewith, a cap secured to the oil pipe and said outer pipe and providing a connecting chamber between the ends of said annular passages, and a gas head located at the upstream end of the outer pipe and having a ring of outlet orifices for discharging fuel gas after the latter has traversed both of said annular passages, thereby cooling the outer pipe of the nozzle within the furnace.

3. A burner for producing carbon black comprising an innermost pipe having a spray nozzle at its discharge end, a bifluid mixing device at its other end, an outer pipe terminating in a cap, an intermediate pipe disposed between the innermost and outer pipes and opening within the cap at its discharge end, a gas-tight seal securing the intermediate pipe to the inner wall of said outer pipe, and a gas head surrounding the outer pipe and having a plurality of orifices disposed about its periphery, whereby atomized oil may be delivered from the spray nozzle and a combustible mixture may be

| Run No. | Make Oil, gal./hr. | Fuel Gas, C. F. H. | Air, MCF/hr. | Make Oil, percent comb. | Yield, #/gal. | $I_2$ Surf. area (sq. in./g.) | Furnace Size | Gas Head Orifices, inches | Standard [1] | Increase in yield over std. av. (#/gal.) | Properties in cold rubber. percent of standard | |
|---|---|---|---|---|---|---|---|---|---|---|---|---|
| | | | | | | | | | | | Abrasion res. | 300 modulus |
| 1272 | 60.2 | 1,988 | 42.2 | 22.6 | 4.33 | 57 | 5.65'x18" | 12⅛ | HAF | 0.83 | 102 | 125 |
| 956 | 38 | 2,913 | 39.1 | 14.51 | 4.08 | 74 | 5.65'x18" | 12⅛ | HAF | 0.58 | 101 | 111 |
| 971 | 39 | 3,000 | 36.6 | 8.24 | 4.60 | 54 | 5.65'x18" | 12⅛ | HAF | 1.10 | 92 | 109 |
| 992 | 39.9 | 2,997 | 36.5 | 7.73 | 4.55 | 51 | 5.65'x18" | 12⅛ | HAF | 1.05 | 101 | 113 |
| 993 | 39.9 | 4,006 | 47 | 7.49 | 3.88 | 73 | 5.65'x18" | 12⅛ | HAF | 0.38 | 113 | 114 |
| 959 | 59 | 3,998 | 47.7 | 6.12 | 5.35 | 44 | 5.65'x18" | 12⅛ | HAF | 1.85 | 78 | 112 |
| 1143 | 60.8 | 3,001 | 49.1 | 8.85 | 3.46 | 69 | 10.65'x18" | 24⅛ | HAF | −0.04 | 112 | 97 |
| 1144 | 40.1 | 3,989 | 47.1 | 7.94 | 3.87 | 71 | 10.65'x18" | 24⅛ | HAF | 0.37 | 106 | 94 |
| 1139 | 59.5 | 4,000 | 49 | 7.22 | 4.79 | 47 | 10.65'x18" | 24⅛ | HAF | 1.29 | 98 | 95 |
| 1138 | 59.4 | 3,983 | 48.4 | 6.45 | 4.63 | 49 | 10.65'x18" | 24⅛ | HAF | 1.13 | 96 | 90 |
| 1377 | 69.8 | 2,998 | 38.7 | 6.60 | 5.28 | 33 | 10.65'x27" | 12⅛ | FEF | 1.03 | 97 | 116 |
| 1341 | 91.4 | 2,994 | 40.7 | 6.35 | 5.54 | 31 | 10.65'x27" | 12⅛ | FEF | 1.29 | 92 | 103 |
| 1371 | 69.7 | 2,998 | 33.9 | 2.02 | 6.25 | 27 | 10.65'x27" | 12⅛ | FEF | 2.00 | 93 | 106 |
| 1323 | 60.0 | 3,000 | 32.6 | 0.97 | 5.50 | 30 | 10.65'x27" | 12⅛ | FEF | 1.25 | 105 | 114 |
| 5086 | 61.2 | 3,001 | | 5.30 | 5.66 | 28 | 10.65'x27" | 12⅛ | FEF | 1.41 | 93 | 116 |
| 5087 | 61.7 | 3,001 | | 8.09 | 4.95 | 36 | 10.65'x27" | 12⅛ | FEF | 0.70 | 106 | 117 |
| 5223 | 60.1 | 3,008 | | 8.64 | 5.48 | 36 | 10.65'x27" | 12⅛ | FEF | 1.23 | 101 | 119 |
| 5205 | 60 | 3,000 | | 6.30 | 4.55 | 33 | 10.65'x27" | 12⅛ | FEF | 0.30 | 103 | 114 |
| 5088 | 69.1 | 3,000 | | 11.7 | 5.02 | 39 | 10.65'x27" | 12⅛ | FEF | 0.77 | 104 | 108 |
| 5243 | 59.9 | 3,000 | | 9.2 | 5.60 | 39 | 10.65'x27" | 12⅛ | FEF | 1.35 | 106 | 118 |
| 5244 | 60.1 | 3,000 | | 9.15 | 5.29 | 37 | 10.65'x27" | 12⅛ | FEF | 1.04 | 103 | 113 |

[1] The standards used are Vulcan 3 for HAF and Sterling SO for FEF, both produced in accordance with the process disclosed and claimed in Friauf et al. application Ser. No. 158,226. The yield figures for the standard are as follows: HAF—3.5 lbs. per gal. of make oil; FEF—4.25 lbs. per gal. of make oil.

It is noteworthy that by following the process and utilizing commercial size apparatus of this invention yields of carbon black product were increased on the average by almost one pound per gallon of raw material, or by about 20%, a truly significant increase. Furthermore, when yield was not increased by any important amount, the qualities of modulus and abrasion resistance were substantially increased.

This application is a division of my co-pending application Ser. No. 281,063, filed April 8, 1952, in which is claimed a novel process of making carbon black that may be carried out by employing the apparatus herein described.

Having thus disclosed my invention and described in detail preferred embodiments thereof, I claim and desire to secure by Letters Patent:

1. In a furnace for producing carbon black, a burner having a discharge nozzle at its inner end, an oil pipe leading thereto, and spaced concentric gas pipes surrounding the oil pipe and providing parallel annular fuel gas passages, the outer gas pipe having discharge orifices located a substantial distance upstream from the disconducted through the burner in reversing flow surrounding the inner pipe in which the oil passes to said spray nozzle.

4. In a furnace for producing carbon black comprising an elongated reaction chamber having a throat of reduced diameter at one end providing combustion space, a burner having an inner pipe for discharging a combustible oil mixture into the reaction chamber, the said inner pipe passing through the throat and being surrounded in the throat by concentric pipes with connections arranged to provide passages for reversing flow of fuel gas in the combustion space of the throat, said connections including means for directing the fuel gas from the end of the inner concentric pipe into the end of the outer concentric pipe, and a gas outlet in the outer of said concentric pipes located to discharge into the furnace throat.

5. In a furnace for producing carbon black, a burner comprising a central pipe having at the outer end of the burner a central discharge nozzle for a combustible oil mixture, a cap surrounding said nozzle, an outer pipe threaded into the cap in concentric relation to the central pipe and having radial fuel gas orifices located a substantial distance upstream from the discharge nozzle, and an intermediate pipe concentric with the outer pipe so as to form parallel annular passages within the burner opening within the cap and providing passage for reversing flow of fuel gas from the cap to the orifices of the outer pipe and consequent heating of the gas.

References Cited in the file of this patent

UNITED STATES PATENTS

| | | |
|---|---|---|
| 365,606 | Kline | June 28, 1887 |
| 764,860 | Moork | July 12, 1904 |
| 1,438,032 | Frost | Dec. 5, 1922 |
| 1,765,991 | Miller | June 24, 1930 |
| 2,331,388 | Graham | Oct. 12, 1943 |
| 2,462,704 | Zink | Feb. 22, 1949 |
| 2,686,560 | Sweigart | Aug. 17, 1954 |

FOREIGN PATENTS

| | | |
|---|---|---|
| 497,377 | Belgium | Aug. 31, 1950 |
| 699,406 | Great Britain | Nov. 4, 1953 |